Figure 1:
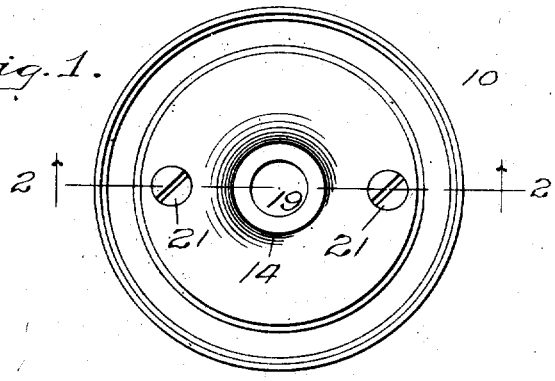

H. HUBBELL.

ELECTRIC LAMP SOCKET.

APPLICATION FILED AUG. 4, 1910.

Reissued Jan. 9, 1912. 13,353.

Witnesses:
Charles C. Abbe
H. E. Keir

Inventor
Harvey Hubbell
By his Attorneys
Howson and Howson.

NORRIS PETERS, INC., LITHO., WASHINGTON, D. C.

UNITED STATES PATENT OFFICE.

HARVEY HUBBELL, OF BRIDGEPORT, CONNECTICUT, ASSIGNOR TO HARVEY HUBBELL, INCORPORATED, OF BRIDGEPORT, CONNECTICUT, A CORPORATION OF CONNECTICUT.

ELECTRIC LAMP-SOCKET.

13,353. Specification of Reissued Letters Patent. Reissued Jan. 9, 1912.

Original No. 943,078, dated December 14, 1909, Serial No. 516,209. Application for reissue filed August 4, 1910. Serial No. 575,578.

*To all whom it may concern:*

Be it known that I, HARVEY HUBBELL, a citizen of the United States of America, residing at Bridgeport, in the county of Fairfield, in the State of Connecticut, have invented an Improvement in Electric Lamp-Sockets, of which the following is a specification.

It is of course well understood that it is desirable that all the parts of electric fixtures be locked together as rigidly as possible, the better to withstand vibration, and that it is absolutely necessary that the socket be placed in such a position relative to the fixture as to permit convenient access to the operating key of the socket.

In order to provide convenient means for locking electric sockets to fixtures that will permit rotation of the socket independently of the bushing and will provide means for locking the socket at any desired adjustment relatively to the bushing, I have devised the novel structure which I will now describe, referring to the accompanying drawing forming a part of this specification and using reference characters to indicate the several parts.

Figure 2:
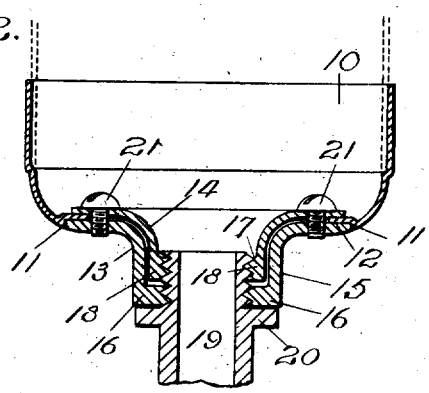
Figure 3:
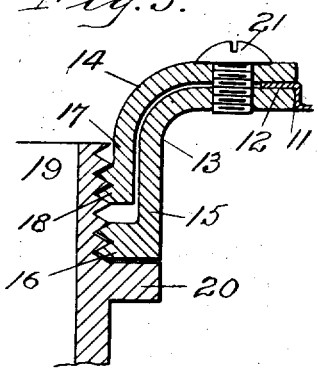
Figure 4:
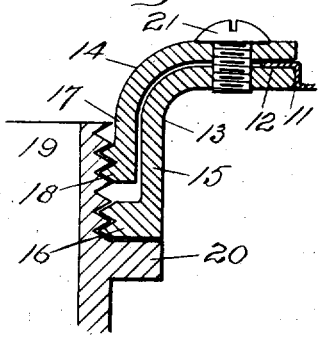

Figure 1 is a plan view of the cap, bushing and socket; Fig. 2 is a section on the line 2—2, in Fig. 1; Fig. 3 is an enlarged detail sectional view showing the members of the bushing in the locking position; and Fig. 4 is a similar view showing the members of the bushing in the unlocking position.

As the detailed construction of the shell of the socket forms no portion of the present invention I have simply indicated a part of the shell by dotted lines in Fig. 2.

10 denotes the cap body of a socket shell which is provided with a central depression 11 at the bottom of which is an inwardly-extending circular flange 12, leaving the center open to receive the bushing part of the cap. The bushing comprises two members or parts, the outer member being indicated by 13 and the inner member by 14. The outer member fits closely in depression 11, is provided with a neck 15 and with an inwardly extending threaded flange 16. The inner member 14 of the bushing is correspondingly shaped and is provided with a neck 17 lying within the neck 15 but wholly out of contact therewith. Neck 17 is likewise provided with an inwardly extending threaded flange, indicated by 18.

19 denotes a fixture which is provided with a male thread adapted to engage the female threads of the flanges of the members of the bushing and is preferably provided with a collar 20. Flange 12 upon the cap lies between the outer edges of the members of the bushing. The members of the bushing are shown as secured together by screws 21 lying opposite to each other. One side of the members may be riveted together if preferred.

The operation will be understood from Figs. 3 and 4. The parts are assembled by placing member 13 of the bushing in depression 11, then placing member 14 of the bushing in place, then securing the members of the bushing loosely together, that is without tightening up the screws, then turning the hub of the fixture to place in the flanges of the bushing and then tightening up the screws. It will be noted (see Fig. 4) that before the screws are tightened up the threads upon the flanges of the bushing engage the hub of the fixture securely but loosely and that flange 12 upon the cap lies loosely between the outer edges of the members of the bushing. In this position of the parts the socket may be rotated freely in order to place the operating key of the socket (not shown) in any desired position relatively to a husk or any portion of an electric fixture. When the parts are in the required position they are locked there by tightening up the screws, or the screw if but one is used and a rivet substituted for the other screw. The effect of tightening up the screw will be readily understood from Fig. 3. The members of the bushing will be drawn toward each other and the flange of the cap will be locked between the outer edges thereof, the female threads upon flange 16 of the bushing will be forced downward upon the male threads of the hub and the threads of flange 18 of the bushing will be forced upward against the male threads of the hub, thereby locking the bushing rigidly to the fixture as well as locking the socket rigidly to the bushing.

Having thus described my invention, I claim:—

1. Means for locking a socket to a fixture, comprising a cap having a flange, bushing members lying on opposite sides of said flange and having female threaded flanges, a male threaded hub engaging the flanges of the bushing and means for drawing the members of the bushing toward each other, whereby the flange of the cap is clamped between the bushing members and the threaded flanges of said members are forced against the threads of the hub thereby locking the cap to the bushing and the bushing to the hub.

2. Means for locking a socket to a fixture, comprising a cap having a central depression and a circular flange, an outer bushing member lying in said depression and engaged by the flange, an inner bushing member engaging the opposite side of the flange, both members of the bushing having female threaded flanges, a male threaded hub engaging said flanges and means for drawing the bushing members toward each other.

3. The combination with a cap having a flange, of bushing members lying on opposite sides of said flange and themselves provided with female threaded flanges, a fixture hub having a male thread engaging said flanges and a screw passing through the bushing members and acting to draw them together.

4. A socket casing having, in combination, a shell, and a cap in two parts having interengaging means constructed to be moved into and out of interengagement with each other, whereby said parts may be locked against relative rotation.

5. A socket casing having, in combination, a shell, and a cap in two parts rotatably mounted one on the other and having provision to lock the same against relative rotation in opposite directions.

6. A socket casing having, in combination, a shell, and a cap in two parts rotatably mounted one on the other and having means to lock the same against relative rotation in opposite directions and prevent separation of said parts.

7. A socket casing having, in combination, a shell, and a cap in two parts one of which is provided with an annular flange and the other of which is provided with means engaging opposite sides of said flange and means to lock said parts against relative rotation.

8. A socket casing having, in combination, a shell, and a cap in two parts one of which is provided with an annular flange and the other of which is journaled thereon and is provided with two projections one on each side of said flange, and means to lock said parts against relative rotation.

9. A socket casing having, in combination, a shell, and a cap in two parts one of which is provided with an inwardly turned annular flange and the other of which is journaled thereon and is provided with outwardly turned projections engaging opposite sides, respectively, of said flange, and means to lock said parts against relative rotation.

10. A socket casing having, in combination, a shell, a cap in two parts rotatably mounted one on the other, and means to lock said parts against relative rotation in opposite directions.

11. A socket casing having, in combination, a shell, a cap in two parts, and means to lock said parts against rotation in any one of a series of different positions.

12. A socket casing having, in combination, a shell, a cap in two parts, and means to lock said parts against relative rotation and to position said parts as to rotative movement with relation to said shell.

13. A socket casing having, in combination, a shell, a cap in two parts, means to lock said parts against relative rotation and to position said parts as to rotative movement with relation to said shell, and means to normally lock said shell and cap against longitudinal separation.

14. A socket casing having, in combination, a shell, a cap in two parts, and means to lock said parts against relative rotation and lock said parts against rotative movement with relation to said shell.

15. A socket casing having, in combination, a shell, and a cap in two parts having interengaging means to lock said parts against relative rotation at a plurality of predetermined points.

16. A socket casing having, in combination, a shell, and a cap in two parts rotatably mounted one on the other and having provision to lock the same against relative rotation at a plurality of predetermined points.

17. A socket casing having, in combination, a shell, and a cap in two parts rotatably mounted one on the other and having means to lock the same against relative rotation at a plurality of predetermined points and prevent longitudinal separation of said parts.

18. A socket casing having, in combination, a shell, a cap in two parts rotatably mounted one on the other, and means to lock said parts against relative rotation at a plurality of predetermined points.

19. A lamp socket, adapted for application to a fixture and having a shell and a cap in two parts, which two parts of the cap are rotarily adjustable one with reference to the other, and means carried by the cap to fixedly secure said two parts together in the position to which they have been rotarily adjusted.

In testimony whereof I have signed my name to this specification, in the presence of two subscribing witnesses.

HARVEY HUBBELL.

Witnesses:
GEORGE T. HADLEY,
HARRY L. STERLING.

Copies of this patent may be obtained for five cents each, by addressing the "Commissioner of Patents, Washington, D. C."